(No Model.)

P. JACOBSON & A. BADE.
COUPLING FOR HOSE, STEAM PIPE, &c.

No. 373,292. Patented Nov. 15, 1887.

Witnesses
Geo. W. Young.
N. E. Oliphant.

Inventors
Peter Jacobson
Albert Bade
By Stout & Underwood
Attorneys

UNITED STATES PATENT OFFICE.

PETER JACOBSON AND ALBERT BADE, OF MILWAUKEE, WISCONSIN.

COUPLING FOR HOSE, STEAM-PIPE, &c.

SPECIFICATION forming part of Letters Patent No. 373,292, dated November 15, 1887.

Application filed June 10, 1887. Serial No. 240,874. (No model.)

*To all whom it may concern:*

Be it known that we, PETER JACOBSON and ALBERT BADE, of Milwaukee, in the county of Milwaukee, and in the State of Wisconsin, have invented certain new and useful Improvements in Couplings for Hose, Steam-Pipe, &c.; and we do hereby declare that the following is a full, clear, and exact description thereof.

Our invention relates to couplings for hose, steam-pipe, &c., and will be fully described hereinafter.

Figure 1:
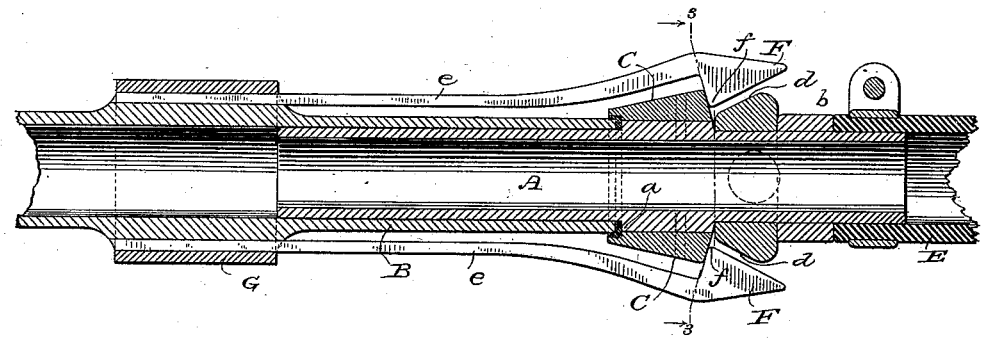
Figure 2:
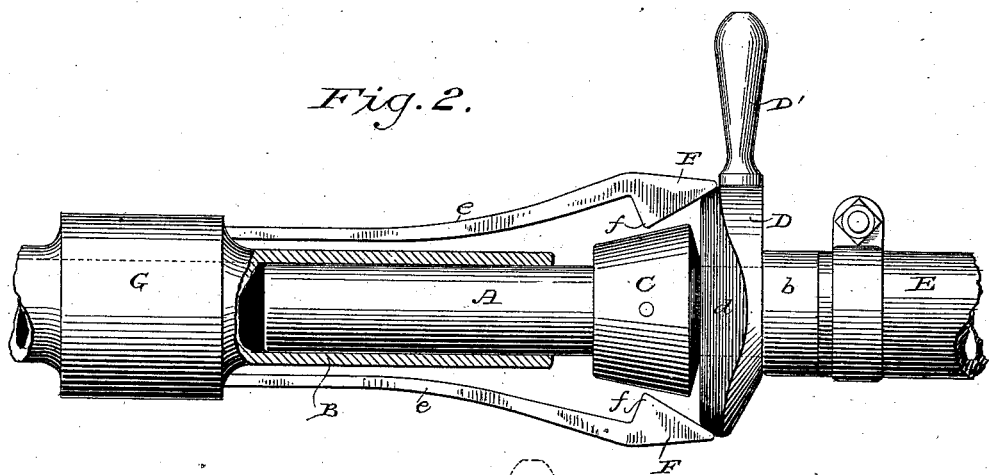
Figure 3:
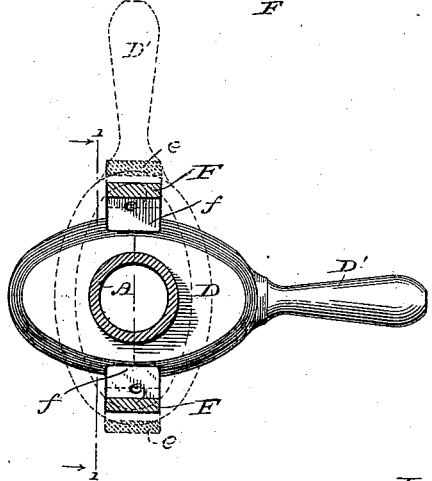

In the drawings, Figure 1 is a longitudinal section through the center of our improved coupling. Fig. 2 is a side elevation of the same, with the coupling-hook disengaged and the female portion partly in section; and Fig. 3 is a section on line 3 3 of Fig. 1.

A is the male part of our coupling, which consists of a cylinder having a reduced portion to enter the female part, B, and a shoulder, *a*, on which a conical collar, C, is secured.

Behind the collar C and shoulder *a* a cam, D, having a handle, D', is fitted loosely, and held up against the shoulder *a* by a collar, *b*, that is riveted or brazed to the part A, and behind this collar *b* one end of the coupling-hose E is securely fastened to the male portion, while a similar male portion (not shown) is fastened to the other end of the coupling-hose E.

The female part of our device consists of a cylinder similar to the cylinder A, but having a sufficient bore to admit the cylinder A, and carries two hooks, F, the shanks *e* of which are secured to it, preferably, by a band, G, and the points of which hooks project out beyond the end of the part B to enable the barbs *f* to ride over the collar C and engage its rear edge, as shown in Fig. 1, when that portion of each hook between the barb and point will lie parallel to the beveled surfaces *d d* of the longest portion of cam D.

The inner end of collar C projects slightly beyond the shoulder *a*, and is offset to form an annular recess, *c*, for the end of part B, and if found desirable this may contain a packing for making the joint steam-tight.

The long faces of cam D are beveled at *d* to an angle that about corresponds to that of the faces of the hooks F, the surface between the dotted lines, Fig. 2, being an inclined plane, and from these lines the face of the cam is gradually rounded and the bevel reduced, so that when the cam is turned from the position shown in Fig. 1 to that shown in Fig. 2 the hooks are not only spread apart so as to be disengaged from the conical collar C, but this action serves to partly withdraw the part A from the part B until the inclined surface of the collar C is between the two hooks, and the latter, by the elasticity of their shanks *e*, will press upon said inclined surface of the collar C and crowd the part A still farther out of part B.

In coupling, the part A is thrust into part B, when the collar C will wedge the hooks apart until the barbs clear its surface, when they will clamp behind it and securely lock the parts together.

Our coupling is tight, secure, and not liable to get out of order. The collar C may be either made separately from the cylinder A, and secured to it as shown, or, if preferred, formed with it.

Having thus fully described our invention, what we claim as new, and desire to secure by Letters Patent, is—

1. In a coupling for hose, steam-pipe, &c., the female part and its hooks that project beyond it, in combination with the male part and its conical collar and a disengaging-cam adapted for engagement with the faces of the hooks when turned to the right or left, as set forth.

2. In a coupling for hose, steam-pipe, &c., the combination of a male part having a conical collar and a female part having projecting hooks for engagement with the collar, and a disengaging-cam having beveled surfaces for engagement with the faces of the hooks, all constructed to operate substantially as described.

In testimony that we claim the foregoing we have hereunto set our hands, at Milwaukee, in the county of Milwaukee and State of Wisconsin, in the presence of two witnesses.

PETER JACOBSON.
ALBERT BADE.

Witnesses:
N. E. OLIPHANT,
MAURICE F. FREAR.